United States Patent
Coleman (10) Patent No.: US 6,304,278 B1
(45) Date of Patent: Oct. 16, 2001

(54) ACHIEVING SYSTEM STABILITY IN ANAMORPHIC PRINTER DEFECT PRE-COMPENSATION

(75) Inventor: Robert M. Coleman, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,484

(22) Filed: Dec. 28, 1998

(51) Int. Cl.$^7$ ........................................... B41J 2/00
(52) U.S. Cl. ................................................ 347/110
(58) Field of Search ........................ 347/110, 19, 133, 347/189; 395/114; 358/518, 504, 515, 505, 474, 520, 530

(56) References Cited

U.S. PATENT DOCUMENTS 5,416,613 * 5/1995 Rolleston et al. ................... 358/518
5,491,568 * 2/1996 Wan ..................................... 358/518

OTHER PUBLICATIONS

Xerox Patent Application 09/222,486, Filed Dec. 28, 1998, David E. Rumph, et al.

* cited by examiner

*Primary Examiner*—John Barlow
*Assistant Examiner*—Charles W. Stewart, Jr.

(57) ABSTRACT

Every printing system has characteristic defects which detract from high quality printing. Xerographic printing systems show defects such as banding, mottled colors in large fill areas, trail-edge deletion and starvation where toner concentrations deplete at certain color edges, misregistration, and so on. Ink jet printing systems can show ink bleeding, streaking in the direction of head movement, and so on. If a printer defect occurs predictably, it is possible to pre-compensate for the defect by modifying the digital signal in such a way that the modifications cancel out or hide the expected defect. However, most printing defects, while statistically predictable, vary over time in the severity and extent of the defect. Some defects, such as misregistration, may vary in severity and direction with each print, because the defect is caused in part by paper feeding and shifting during printing. Other defects, such as trail-edge deletion, starvation, halo, tenting, etc. may change more slowly because they are controlled in part by environmental conditions such as humidity or definable printing conditions like paper type. The invention proposes a method whereby defects that vary sufficiently slowly in a particular printing system are measured for extent and severity at appropriate intervals, and the measurements are used to modify correction functions applied to the digital data to pre-compensate for these defects. In this way, the corrections applied will track more precisely the current extent and direction of the defects they are correcting.

6 Claims, 7 Drawing Sheets

ACHIEVING SYSTEM STABILITY IN ANAMORPHIC PRINTER DEFECT PRE-COMPENSATION

BACKGROUND OF TIRE INVENTION

1. Field of the Invention

The present invention relates to highquality digital printing in which objects are intermixedly printed, and more particularly, in which a printing process exhibits characteristic, statistically predictable defects which degrade quality and whose characteristics vary sufficiently slowly over time. For systems which pre-compensate for such predictable defects by modifying the digital data in advance, it is possible to measure known sample prints at appropriate intervals and use the results of such measurement to modify the pre-compensation functions so as to more closely track variations in each defect's signature.

2. Description of the Related Art

Digital color printers form a digital image for each of several separations, such as cyan, magenta, yellow, and black. The digital image instructs the printing mechanism in the amount of each color ink to deposit and the method of deposition at each addressable point on the page.

A digitally imaged page can consist of graphical objects such as text, lines, fills, pictures, etc, all imaged in ways which can be isolated from each other, can abut one another at one or more points, can partially overlap, one another, or can completely overlap one another. The resulting printed page or graphic image is therefore made up of a patchwork of shapes representing the graphic objects, some of which are "clipped" by objects imaged later in the succession.

In practice, every color printing system has characteristic defects which can cause subtle problems that detract from achieving the highest possible quality color printing. For example, ink jet printing must handle excessive ink coverage which can cause bleeding or spreading of colors and paper distortion. Xerographic printing contends with a different set of problems which can detract from print quality. Examples are "haloing", in which toner in one separation interferes with toner transfer at the same location in another separation, "tenting", which is toner deletion caused by high toner pile casting a mechanical or electrostatic "shadow" which prevents correct development of abutting toner, trail-edge deletion and starvation, which cause toner deletion at certain edges, or misregistration between two colors. Many of these characteristic problems in printing systems can be traced to undesirable interactions between abutting colors on the page.

Despite known problems, the digital image sent to the printer has in the past assumed a perfect printing mechanism, and provided an ideal image to print. While increasingly sophisticated controls have been added to printing mechanisms to reduce defects and come closer to the perfect printer expected by the digital image, electro-mechanical defects in any printing system are still common and are to be expected at both the low end where system cost restraints preclude use of expensive controls and the high-end where production speeds challenge existing control systems.

Recent work has begun to look at modifying a digital image in advance in order to pre-compensate for expected problems in a printer. The work may be divided into three groupings. A first grouping of prior art does "object-based compensation", which predicts and pre-compensates for printing problems unique to each object type (text, fill, image, etc.). A second grouping of art does "tapping compensation", which predicts and pre-compensates for only one printing problem: misregistration between two abutting colors. A third grouping of art does a more generalized, object-optimized "edge-defect compensation."

The first (object-based) grouping deals with individual printing objects such as text, fill, or picture, without reference to other adjacent objects. Different object types have different predictable printing problems. For example, a large uniform color fill can contain visible mottle in what should be smooth color, because the random noise of the print mechanism causes tiny variations in the amount of color put on the page; a "quiet" halftone that masks engine noise can be used in printing such a fin. Text can show fuzzy edges if the normal halftone resolution is too large; a small halftone can be chosen to print text with sharper edges. Graphics can have dull colors while images can have unreal colors; the solution is to pre-compensate by choosing a different color transform for graphics than for images.

The second (trapping) grouping of prior art is more limited in scope in that it attempts only to pre-compensate for a single painter defect caused by adjacent colors: misregistration. If a printer misregisters between separations, an thin unwanted white or color line occurs when certain adjoining colors don't abut perfectly. This second group of inventions doesn't care about individual object types or a large range of printer defects as the first (object-based) grouping does. Instead, this group of prior art simply looks at the edge between two color areas, attempting to predict when two abutting colors could cause a thin line problem if the printing system misregisters. The solution used is to generate a fixed-width, constant color fill (a "frame" or "trap") whose color and position is calculated with various methods from the two abutting colors, and to superimpose that new digital signal with the original signal to produce prints that show the misregistration problem less.

The third (generalized edge-defects) approach combines both object and color information to predict and correct a wider range of adjacency problems in a novel way. Unlike the group one (object-based) inventions above which use object information to predict individual object printing problems, the third approach uses object information to help predict and solve printing problems caused by object adjacencies. Unlike group two (trapping) inventions above which only correct for misregistration, the third approach significantly extends the range of adjacency problems that can be detected and corrected. Detection of a larger number of adjacency problems is made possible by including not just color information in predicting adjacency problems but also object information such as object type, object size in the scan and process directions, rendering intent, and other relevant object parameters. Pre-compensation/correction of a larger number of adjacency printing problems (beyond simply misregistration) is made possible by using a novel approach different from the simple trapping solution of adding a uniform-width, constant-color frame between two adjacent colors. Instead, a function is applied to an object edge that can change both its color and rendering hint anamorphically (that is, differently in the process or scan directions) as a function of the distance from the edge.

All three of the approaches to digital data pre-compensation are described in the patent application Rumph et al., application Ser. No. 09/222,486 filed Dec. 28, 1998, titled "Anamorphic Object Optimized Function Application for Printer Defect Pre-Compensation", which is incorporated herein by reference.

The focus of this invention is not on the method used to pre-compensate digital data to reduce printer defects, but rather on achieving long term stability in the results. If the extent and severity (the "signature") of a particular defect changes over time, it will not be optimally effective to apply a fixed pre-compensation to the defect based on one or a few measurements made at only one particular point in time.

It is well known in the art to use color measurements to maintain color fidelity in color printers. Printer characterization is done to map requested colors to c,m,y, k values used by the actual printer. Then, printer calibration is done to prevent the printer from drifting in its color representations. To do this, color patches with known values are printed at periodic intervals. The actual printed color values are measured, and by comparing the actual measurements with the expected values, color transform data can be modified to correct for the current state of the printer.

U.S. Pat. No. 5,416,613 to Rolleston et. al. describes a method of calibrating a printer using a test image comprising a number of randomly located test patches, some of which may be repeated to constrain printer non-uniform color response at different points on the page.

U.S. Pat. No. 5,537,516 to Sherman et. al. presents a method for calibrating a printer by using various measurement devices and generating a set of calibration curves as modifications of each of the individual color print channels (e.g., CMYK).

U.S. Pat. No. 5,739,927 to Balasubramanian et. al. describes a method for refining an existing printer calibration using a small number of color patch measurements.

U.S. Pat. No. 5,809,213 to Bhattachaiya provides a method and apparatus for automatic color correction in which a nonlinear interpolation technique is applied to a relatively small number of measured sample values from color patches.

U.S. Pat. Ser. No. 09/012,651 to Rumph takes color calibration a step further by describing a method that maintains color fidelity taking into account object type, noting that objects rendered with different halftones and different rendering intents must necessarily be calibrated separately, since the response of a printing system to different halftones drifts at different rates.

These patents describe a number of different techniques for measuring various numbers and arrangements of color patches in order to keep the color printing system stable with respect to color rendition.

However, nowhere in the art is the problem addressed of printer defects being measured in extent and intensity in order to track changes in defect signature and change the pre-compensations applied to digital data to correct the defects with greater stability.

To solve this problem, the invention describes a method and apparatus for measuring printer defects at appropriate intervals of time and using the measurement data to correct pre-compensations applied to digital data. The measuring instruments used and the measurements taken are more complex than those that are used to measure color patches, because the printer defects being measured consist not of simple color patches but of subtle unwanted changes of color intensity in two directions over small spatial, areas.

For example, a xerographic printing problem called trail-edge deletion can occur when a color fill with sufficient size in the process direction is printed. At the lower process direction edge, for electrostatic reasons having to do with the approaching edge, the toner is often gradually depleted, resulting in an increasingly lighter color as the printer approaches the edge. This printing problem may be corrected by applying a function which changes the density of the color near the edge as a function of the scanline distance from the edge, as described in co-pending application "Anamorphic Object Optimized Function Application for Printer Defect Pre-Compensation". Note that the function is anamorphic (since only process direction edges are modified) and therefore the measurement of gradual color deletion as the edge approaches must in this case be made on a process direction edge. Depending on environmental factors such as humidity, on paper type, on machine age and amount of recent use, and on the age and state of the toner, the intensity of deletion, the spatial extent of the deletion, and the rapidity of the dropoff at the edge all can subtly but measurably change. Without measurements at intervals to track these changes over time, the pre-compensation applied to the edge to correct for trail-edge deletion will not be as successful as if the signature of the tail-edge deletion had been measured recently.

Note that not all printing defects change characteristics over time. The resolution of text edges, for example, is fixed by system resolution and choice of halftone. Available color levels for images is also fixed by image halftone choice and does not vary significantly.

However, there is a large class of printer defects which do drift slightly but significantly in both extent and intensity over time. The amount of mottle in a color fill can vary over time with environmental and paper changes. Similarly, trail-edge deletion, starvation, misregistration, haloing, streaking, and other defects have the characteristic of being subtle but visible unwanted variations of color over a small area of the page, and are often sensitive to slow-changing variables such as environment, paper type, machine state, toner and ink age, and so on. As such, they are subject to being controlled with greater stability if careful measurements are taken and the results used to change the pre-compensation functions for those defects.

As will be made clear, the test patterns used for measurement must comprehend the range of object types; a trail-edge deletion for text halftones wrn be significantly different from that for image halftones. They must also take into account the anamorphic mature of printer defects; i.e., they must allow for measurement of edges in both the scan and process directions.

OBJECTS AND SUMMARY OF THE INVENTION

One object of the present invention is to provide that a set of patterns be used by which a printing problem may be measured, taking into account relevant variants such as multiple adjacent colors and/or object attributes such as rendering intent, size, or extent in scan or process directions.

Another object of the present invention is to provide a method and a means for measuring a predicted printing problem which can measure the change in the extent of the printing problem in the process direction (down the page) or the scan direction (across the page), in order to better track changes in the majority of printing problems which are asymmetric (different in the scan and process directions).

Another object of the present invention is to provide a method and a means for measuring a predicted printing problem which can measure the change in the intensity of the printing problem as a function of distance from an edge, in order to better track changes in the intensity signature of the printing problem.

Another object of the present invention is to provide a method for correcting the precompensations that are applied to digital data for a predicted printing problem based on the measured changes in the printing problem in the process direction (down the page) or the scan direction (across the page).

To achieve the foregoing and other objects and to overcome the shortcomings discussed above, a digital color measurement method and system is provided which measures known test patterns at intervals of time short enough to effectively track changes in intensity and extent in process and scan directions of known printing defects, using information of each test pattern such as the printing defect being measured, the colors, rendering intents, size, and object type. Having measured a set of potential printing problems, a method is provided based on the measurements to correct any pre-compensations which may be applied to digital data that is predicted to show a particular printing defect. The invention allows a digital color printing system to more accurately pre-compensate for predicted printing problems by using measured test data to guide the pre-compensations being applied, taking into account various attributes of the pixels (color, rendering intent, object type, etc) and the anamorphic nature, of the printing defect.

By applying such corrections based on measured changes to printing defects, a pre-compensation can be created which more effectively blocks or masks a variety of potential printing problems to increase overall image quality.

BRIEF DESCRIPTION OF THE DRAWINGS

The invention will be described in detail in reference to the following drawings in which like reference numerals refer to like elements and wherein.

DETAILED DESCRIPTION OF A PREFERRED EMBODIMENT

The following notation will be used below to designate the two important directions in printing. The letter "S" will be used to designate the Scan direction (the direction of the scanlines); that is, the direction the laser beam or ink jet Scans across a page. The letter "P" will be used to designate, the Process direction (the direction orthogonal to S); that is, the direction the printing Process moves down the page as the laser scans each succeeding line.

Figure 1:
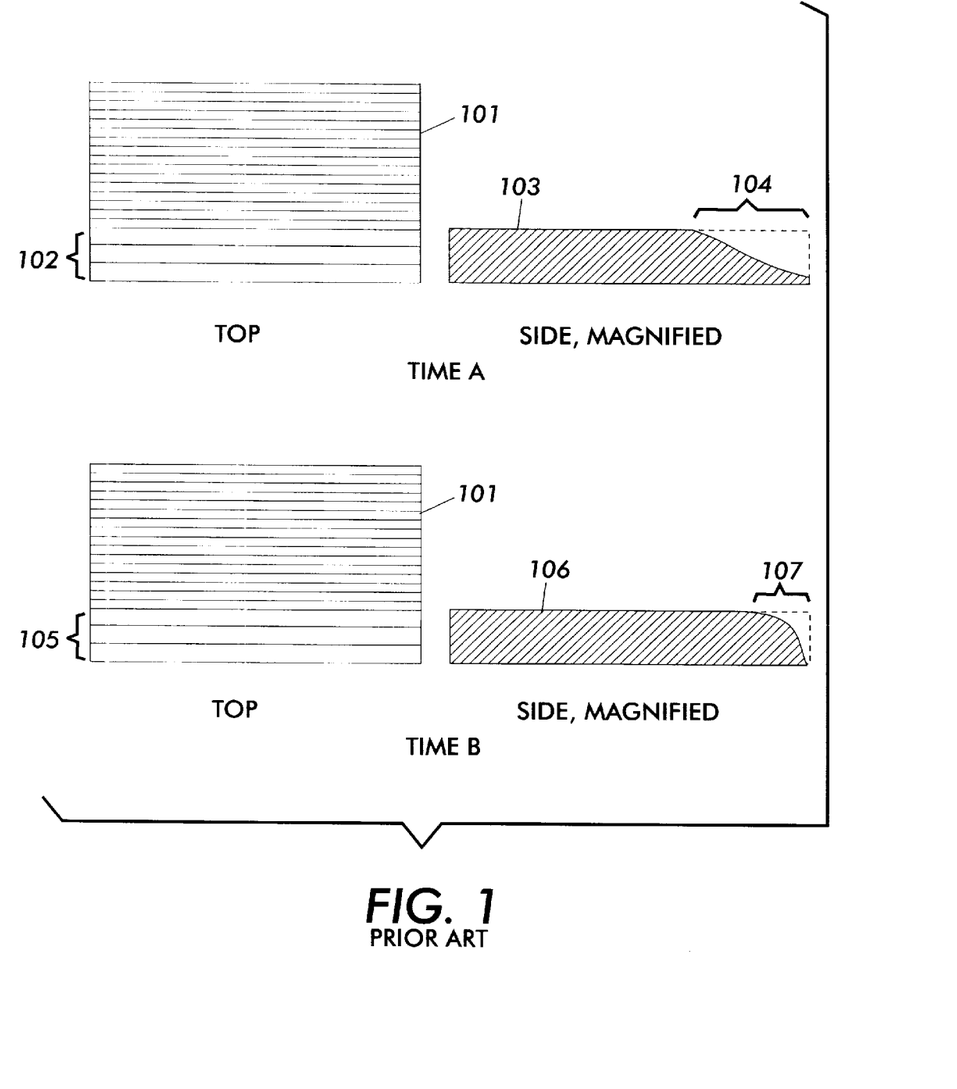
FIG. 1 shows an example of a trail-edge deletion printing problem that varies over time in extent and in intensity signature.

FIG. 1 shows an example of a printing problem called trail-edge deletion. This printing problem occurs in some xerographic printing systems whenever there is a color fill which is sufficiently large in the process direction and sufficiently wide in the scan, direction and which terminates on a process direction edge. In these cases, the ink or toner can sometimes fade out at the lower edge, producing an objectionable lightening of color along that process-direction edge.

In the first example in FIG. 1, measured at time "A", a trail-edge deletion problem 102 is shown in fill 101. At time A, the amount of deletion at a particular edge with particular color and size in the process and scan directions is measured to be as shown in the side view 103, with the dropoff 104 of color intensity as a function of distance from the edge shown. The dotted line indicates the desired level of toner; the actual level of toner can be seen to drop at the edge over the distance indicated by 104, with a signature of drop-off rate shown.

The second example in FIG. 1 shows the same trail-edge deletion problem at Time B, a later point in time wherein the signature of the deletion 105 in fill 101 at the bottom process edge is measured to have changed subtly but significantly in color intensity as a function of distance from the edge, as shown inside view 106. The dotted line indicates the desired level of toner, the actual level of toner can be seen to drop at the edge over the distance indicated by 107, with a signature of drop-off rate shown.

As can be seen, the same fill 101 at different times can show different extents and intensity signals of toner deletion, though both are objectionable.

Figure 2:
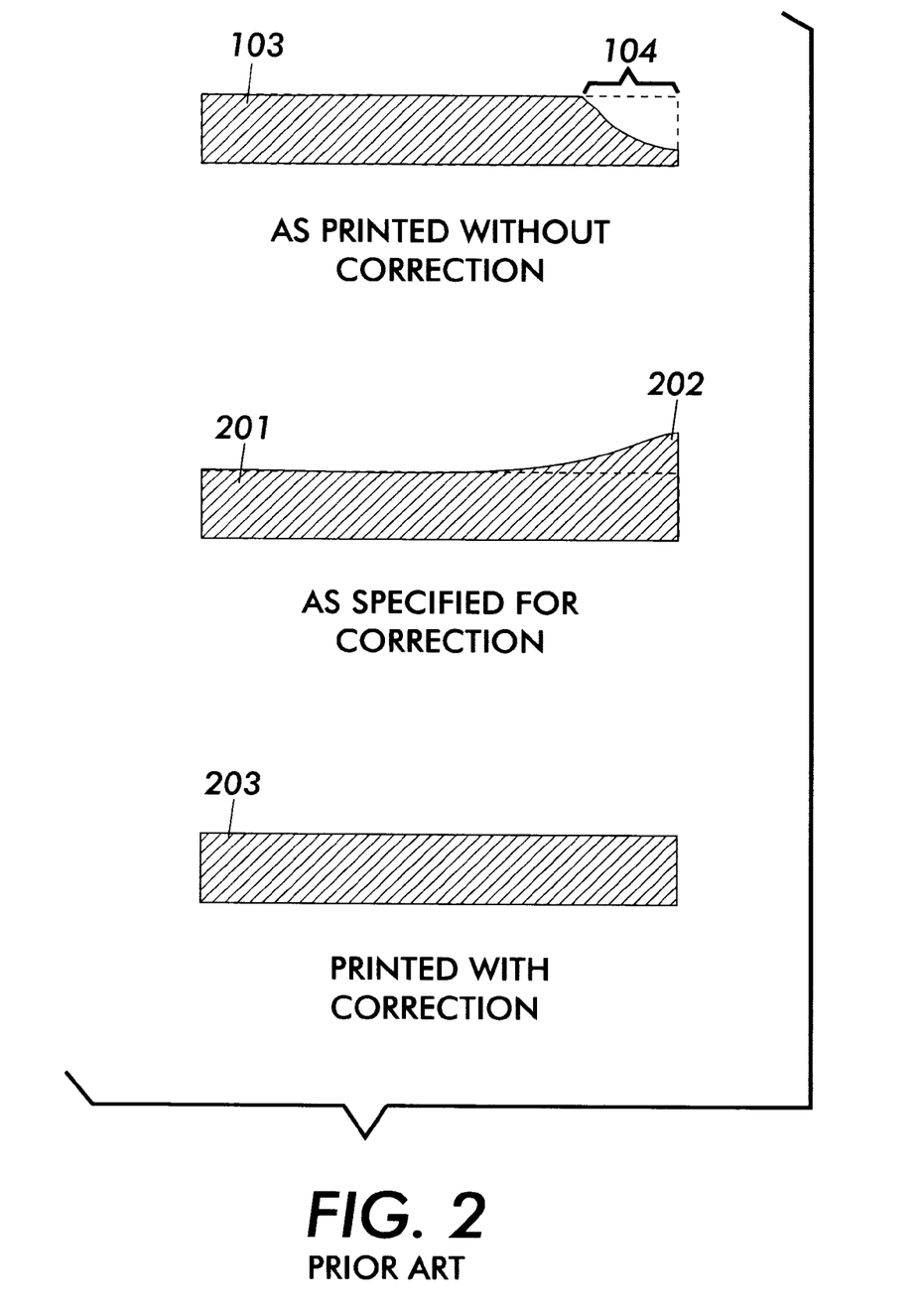
FIG. 2 shows an example of changes made as a result of a measuring system tap the pre-compensations applied to counteract the trail-edge deletion printing problem of FIG. 1.

FIG. 2 shows an example of a function applied to digital data to attempt to correct the trail-edge deletion problem of FIG. 1. As can be seen, the amount of toner specified to be printed is increased at the edge 202, where it is expected that the printer will (because of the predicted trail-edge deletion) decrease the actual amount printed. If the correct increase function 202 is applied, a flat fill 203 will be printed, since the increase in toner specified at the edge will be counteracted by the decrease caused by the deletion problem.

Figure 3:
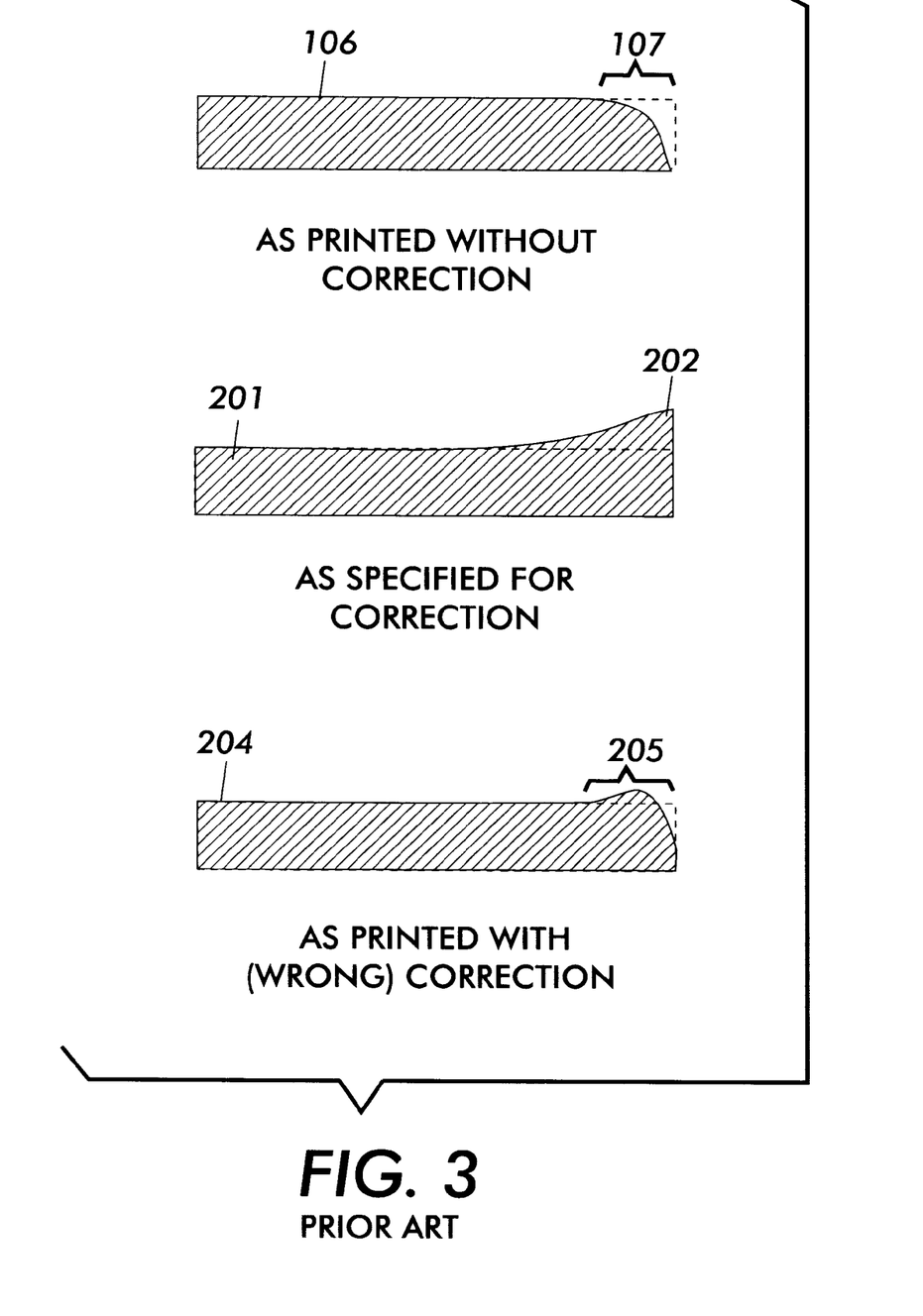
FIG. 3 shows examples of test patches according to the method of this invention which present the trail-edge deletion problem to a measurement system, taking into account variables of color difference across an edge, color intensity, edge angle, separation (cyan, magenta, yellow, black), and extent in the scan direction.

FIG. 3 shows the situation if the same increase function 202 is applied after the, trail-edge deletion problem has drifted and changed dro-poff signature. The new trail-edge deletion signature is shown side-view 106 with drop-off 107 just as in FIG. 1. If the system does not know that the trail-edge signature has drifted, it will apply the same specified toner function 201 as in FIG. 2. Again, the amount of toner specified to be printed is increased at the edge 202, where it is expected that the printer will (because of the predicted trail-edge deletion) decrease the actual amount printed. However, since the applied increase function 202 is no longer correct for the current signature of trail-edge deletion, the printed result 204 is not the desired flat fill. Instead, at the trail-edge 205, the function 202 applied did not exactly match the current drop-off signature 107, and the edge 205 exhibits an undesirable increase followed by a decrease in toner amounts.

To correct the problem shown by FIG. 3, wherein the signature of a printing defect has changed and the system has applied a function which is no longer correct and which therefore is not maximally effective in masking the defect, a measurement system is added to the printing system which can, at intervals, measure the printing defects of interest to obtain new signatures showing color change over distance. In this way, the functions being applied can be updated to reflect the current signatures of the printing defects of interest.

The scanning system used to measure the amount of a color as a function of distance from an edge can be conventional but must have sufficient resolution to be able to track the signature of a trail-edge deletion or other such problem This requires much more precision than does the process of measuring a color patch for color values only, where the field of view is made large enough to average out the slight color differences in a measured patch of color. In the case of this invention, we are in fact looking for the signature of those slight color differences, not trying to average them out. When measuring printing defects which are by definition those very small changes in color intensity over small distances in the scan and process direction, it is necessary to utilize a measuring device whose resolution is fine enough to accurately record the change in color intensity scanline by scanline as an edge is approached. In the preferred embodiment, a scanner with at least the resolution of the printer is used to provide accurate measurements of the amount of color per scanline as a color edge approaches.

Figure 4:
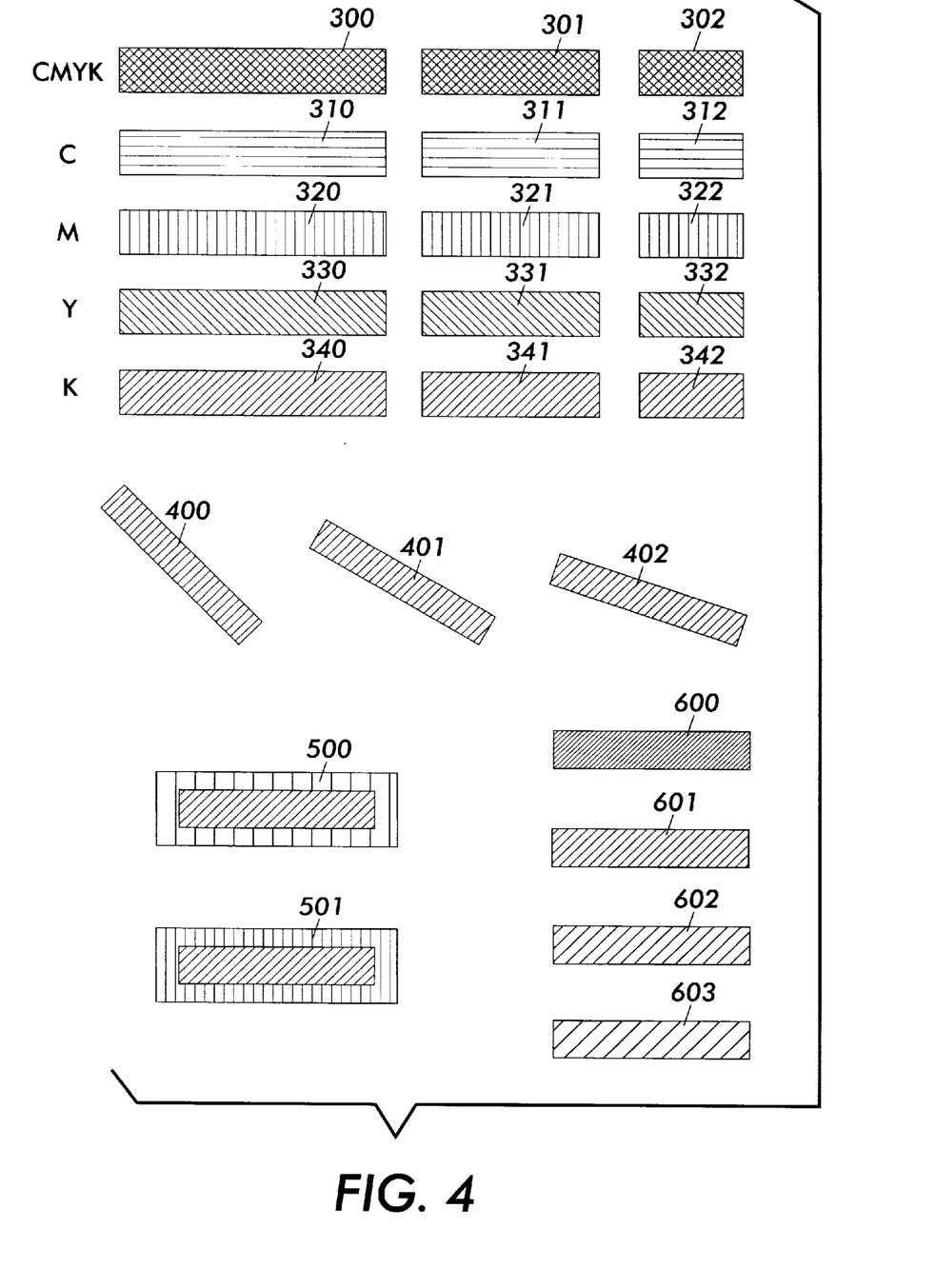
FIG. 4 shows a scanning system which is able to measure density of color as a function of distance from an edge at sufficient resolution to be able to track the intensity signature of a trail-edge deletion problem.

To get an accurate record of the current signature of a printing defect, test patterns must be used which test the defect in a variety of situations. In FIG. 4, examples are shown of some variant test patches which could be used to accurately track changes in the trail-edge deletion problem shown in FIG. 1. The trail-edge deletion problem varies in intensity depending on the size in the process and scan direction of the color fill being printed. It also can vary depending on the separation (cyan, magenta, yellow, black, or combinations) being printed, because in some systems the electrostatic conditions at each color development station is subtly different, and also because the problem in more visible in some toners (such as cyan) vs others (such as yellow). Patches 300, 301, and 302 show three different size patches rendered in a combination c, m, y, k amounts of ink. Similarly, patches 310–312 show three different cyan (c) patches, 320–321 show magenta (m) patches, 330–332 show yellow (y), and 340–342 show k (black) patches. Trail-edge deletion also varies depending on the angle of the edge, with completely horizontal, process direction edges showing the problem the most. Thus patches 400, 401, and 402 show sample angles different from horizontal, so that the amount of difference in the problem can be measured at different angles. Trail-edge deletion also varies with the difference in total color across an edge, with larger differences in color tending to exhibit the greatest defect. Test patches 500 and 501 are examples of measuring the trailedge deletion of the inner patches with different color differences from the outer patches. Finally, the amount of trail-edge deletion varies with color density, and patches 600–603 show different color densities able to be measured.

Thus, test patches according to the method of this invention will present the trail-edge deletion problem or a similar printer defect problem to a measurement system with sufficient variation to effectively take into account variables of color difference across an edge, color intensity, edge angle, separation, extent in the scan direction, and so on. The patches shown in FIG. 4 exemplify variations possible but are not of course comprehensive.

Figure 5:
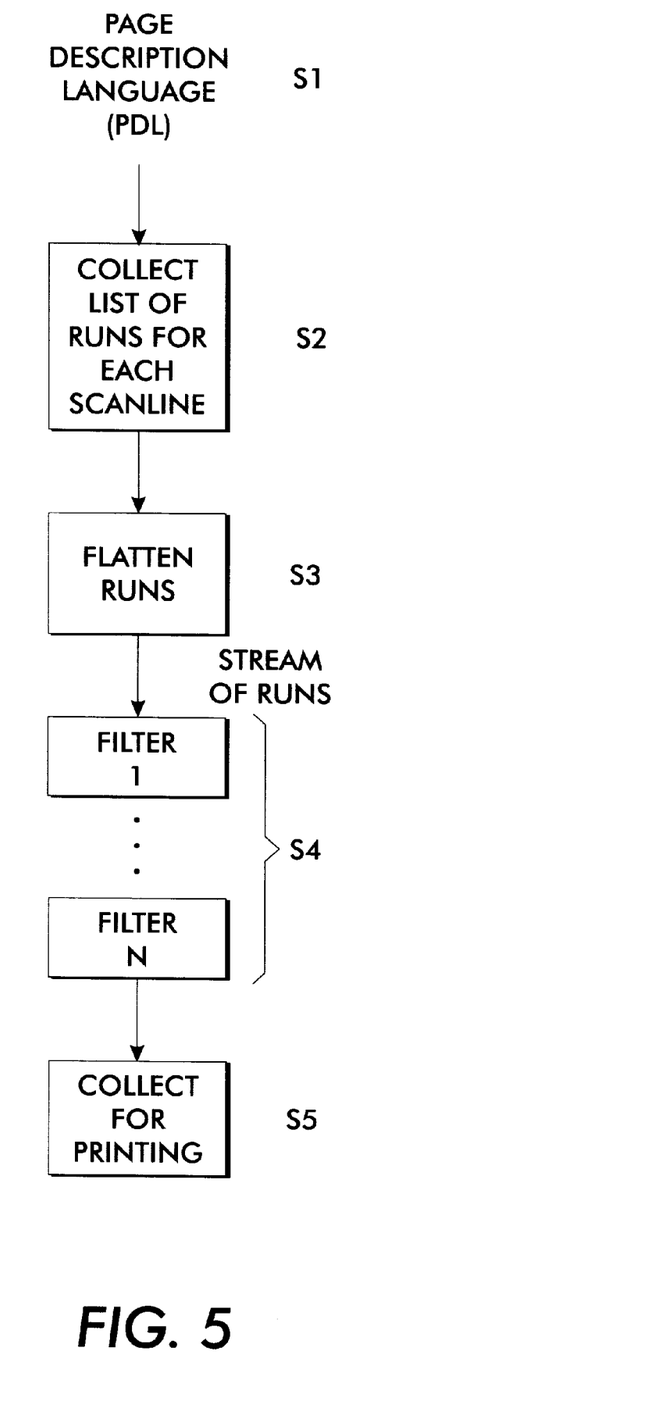
FIG. 5 shows the functional blocks of the color imaging system within which a preferred embodiment of the invention is constructed.

FIG. 5 shows an overview of the high-quality color imaging system within which a preferred embodiment of the current invention can be implemented. The imaging system prepares pages for printing with the following steps:

1) In step S1, a page description language is received which contains instructions giving the location, shape, color, attributes, etc of printable objects on the page.

2) In step S2 the imaging system collects, for each scanline on a page, the runs of color which define the objects on that scanline. Each collected run includes a length, a color, tags identifying the source object type, and other salient parameters to aid in optimal rendering.

3) As collected, runs from overlapping objects will of course also be overlapping. In step S3 the system "flattens" these overlapping runs by identifying at each point in the scanline the "on top" run, with the result that each scanline is a stream of abutting runs ("flat runs") that define the colors and objects on the page for that scanline.

4) In step S4 the stream of flat runs is sent to a series of "filters" which can operate in an ordered chain on individual or grouped flat runs in one or more scanlines to modify them before printing. In the context of this invention, at least one of these filters is responsible for modifying runs of color in order to pre-compensate for a particular printing defect involving unwanted color intensity changes over a measured distance.

5) In step S5 the filtered runs are merged into the page data for printing.

Figure 6:
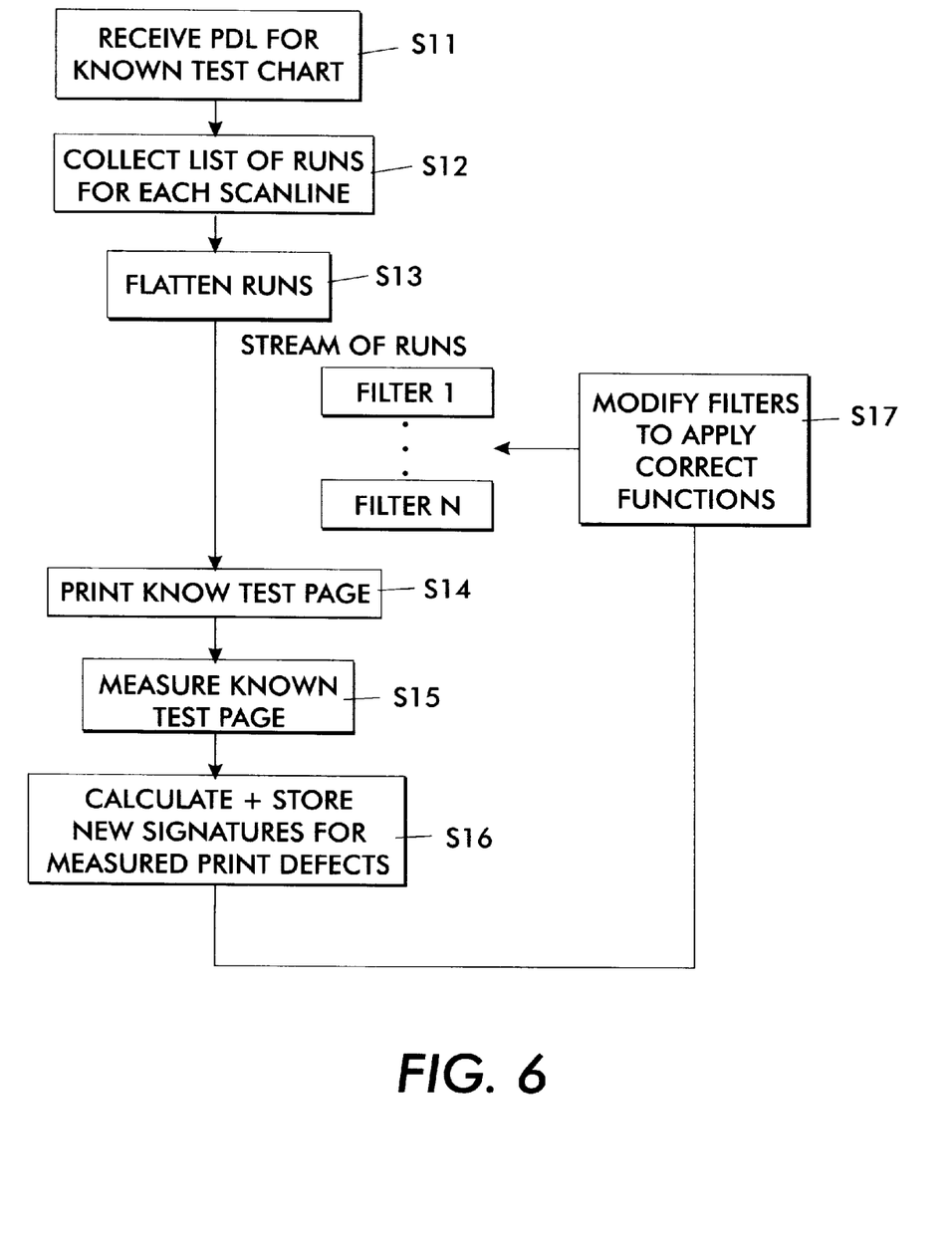
FIG. 6 shows the functional blocks of the color imaging system functioning in test mode according to a preferred embodiment of the invention.

A FIG. 6 shows an overview of the same high-quality color imaging system in which a preferred embodiment of the current invention is running in a test mode for measuring changes that may have occurred in printer defects.

The test mode is entered at intervals roughly determined by the rate at which the tested panting defect is expected to change significantly. That time period may be determined by changes to the type of paper, by a period of time such as a day or half-day within which the machine, state may be reasonably expected to have changed, by a certain number of prints having been made, or by the printer operator as needed or when defects are noted. The imaging system prepares a test page for printing with the following steps:

1) In step S11 a page description language of a test page is received which contains instructions giving the location, shape, color, attributes, etc of printable objects on the page. In the case of this invention, the page being prepared includes known patterns that stimulate a particular printing defect or defects with a range of relevant variants, such as different separations (cyan, magenta, yellow, black), different edge angles, different color densities, different object attributes, and so on.

2) In step S12 the imaging system collects, for each scanline on the test page, the runs of color which define the objects on that scanline. Each collected run includes a length, a color, tags identifying the source object type, and other salient parameters to aid in optimal rendering.

3) In step S13 the runs are "flattened" as before to a stream of non-overlapping runs per scanline.

4) In step S14, by contrast to the normal mode in which runs are sent to a series of "filters" to modify them to mask defects, the filters are bypassed and the raw, unmodified runs are merged into the page data for printing.

5) In step S15 the results of the test patterns are measured to find the current "signature" of the printing defect or defects being tested, where the signature includes the change in unwanted color intensity over distance in the process and scan directions. The measurements may be made at various points in the printing process. In some printing systems, measurements may be able to be made to an image before it is transferred to paper, such as a toned image on a photoconductor in a xerographic printer. This avoids having to deal with the disposal of a printed test image. In many cases, however, the test image must be printed on paper for the defect to show up and be measured. In this case, the measurements may be done by an operator or may be automated to measure as the paper exits the printer.

In order to measure such small effects accurately, the location and orientation of a test pattern must be known precisely. For measurements done on a printed page, the test page may contain easily identifiable marks at known places on the page, and the test patterns are arranged such that they are in a known location with respect to the identifiable marks on the page. The expected defect zone is also known for each test pattern. Depending on the quality of the measurement system, multiple scans may be performed with results averaged.

6) In step S16, the results of the measurements are processed, and the information is used in step S17 to modify the functions which will be applied by the run filters during normal processing (see step S4 of FIG. 5). The functions are modified to respond to the intensity and extent of a printing defect as currently measured, so that machine drift no longer need result in incorrect pre-compensation of a printer defect.

The test procedure may be performed multiple times if necessary. The determination is made by printing the test print or another print in normal mode, with new pre-compensations applied, and measuring or observing if sufficient corrections have been made to the pre-compensation functions to mask the printer defect or defects acceptably.

Figure 7:
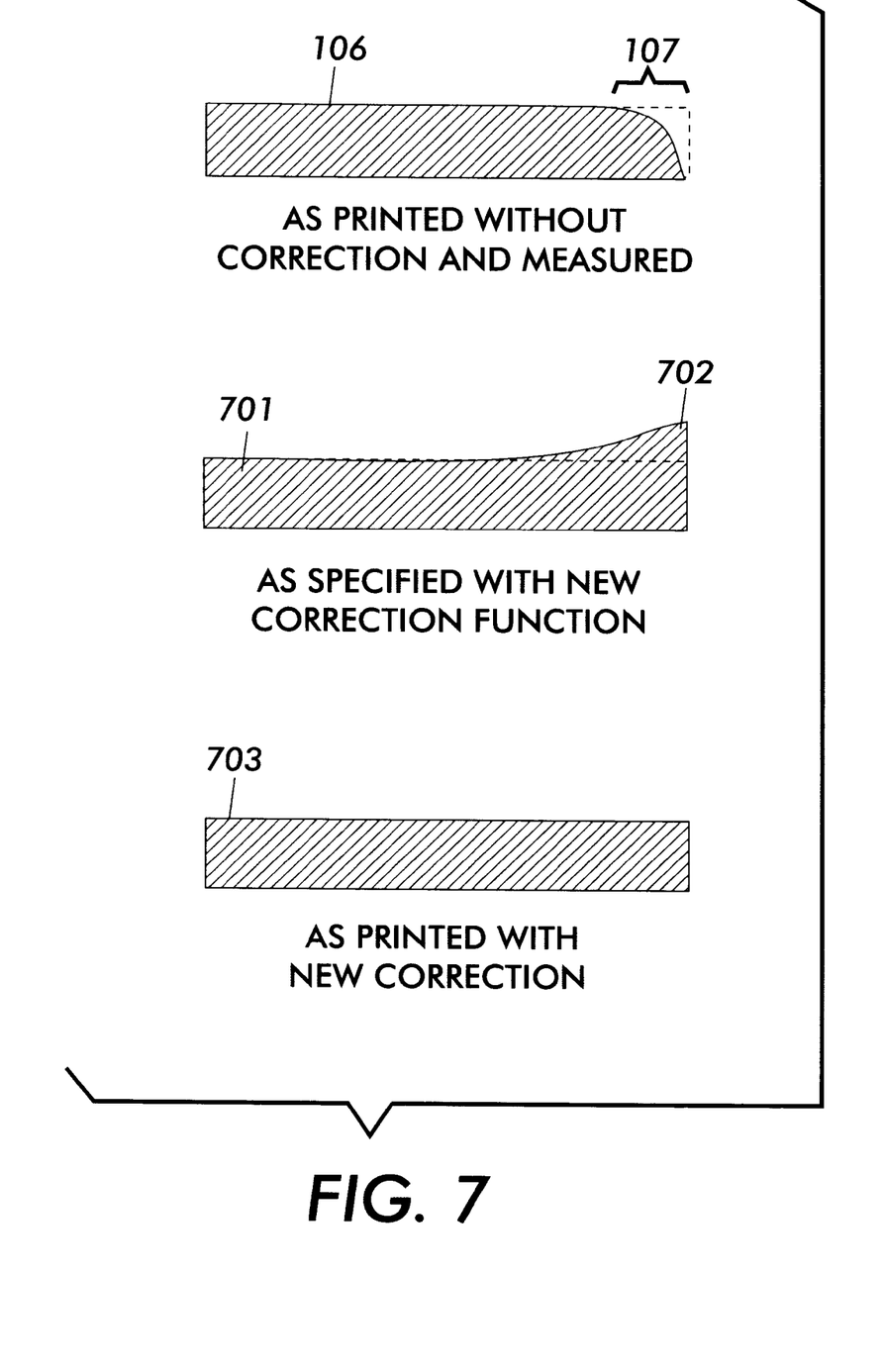
FIG. 7 the steps used in the invention to measure a known set of patches and use resulting intensity and extent information to correct a function being applied to digital data for improving a printing defect.

In FIG. 7, again using the trail-edge deletion printer defect as an example, the problem of FIG. 3 is shown as corrected. The trail-edge deletion signature after the machine has drifted is shown side-view 106 with drop-off 107 just as in FIG. 3. Unlike FIG. 3, the new trail-edge problem is measured, and the new measured trailedge signature corrections 701 are applied with an increase in specified toner 702 shown to match the measured trail-edge deletion problem. Note that both the extent of the trail-edge problem (that is, the number of scanlines prior to an edge at which the color density begins to fade), the intensity of the problem (that is, the amount of color density loss that occurs) and the signature of the problem (that is, the shape of the drop-off function) may have all changed, and that the pre-compensation function can be changed correspondingly. In 703, a flat print without toner depletion at the edge is shown to have been printed, because the pre-compensation function applied had been corrected by measurements.

The prior pre-compensation function applied in FIG. 3 did not adequately pre-compensate for the new signature of the trail-edge deletion problem. This holds true, of course, for other adjacency-effect printer defects. By measuring the problem at intervals and changing the pre-compensation function to track those measured changes in a printing defect, the printing system is able to remain much more stable in its ability to improve a printing defect's appearance. Because many of the printing defects addressed by this invention are so variable, such a measuring system and method allows a stability unattainable otherwise.

While the above is a complete description of a preferred embodiment of the invention, various alternatives, modifications, and equivalents are possible. Therefore, the above description does not limit the scope of the present invention. The appended claims define the scope of the invention.

What is claimed is:

1. A method of pre-compensating for potential printing defects in a printer, comprising:

detecting a pattern in digital image data that causes a printing defect, wherein a printing defect comprises a statistically predictable characteristic which degrades print quality and varies over time;

pre-compensating for said printing defect, wherein pre-compensating comprises modifying digital data in advance to remove the characteristic;

subsequently, printing at least one example of said pattern in a known location;

measuring printed values of said pattern at said location to determine a current value of said characteristic; and modifying said pre-compensation responsive to said current value of said characteristic.

2. The method of claim 1, wherein the characteristic is at least one of banding, mottled colors in fill areas, trail-edge deletion, starvation, misregistration, haloing, streaking, shadowing and tenting.

3. The method of claim 1, wherein measuring printed values of said pattern comprises measuring changes in extent along at least one of a process direction and a scan direction.

4. The method of claim 1, wherein measuring printed values of said pattern comprises measuring changes in intensity along at least one of a process direction and a scan direction.

5. The method of claim 3, further comprising measuring said pattern at intervals of time short enough to track changes in extent in said process and scan directions.

6. The method of claim 4, further comprising measuring said pattern at intervals of time short enough to track changes in intensity in said process and scan directions.

* * * * *